Nov. 13, 1951 H. E. KALLMANN 2,574,975
ELECTRON BEAM DEFLECTING SYSTEM
Filed Jan. 17, 1950 3 Sheets-Sheet 1
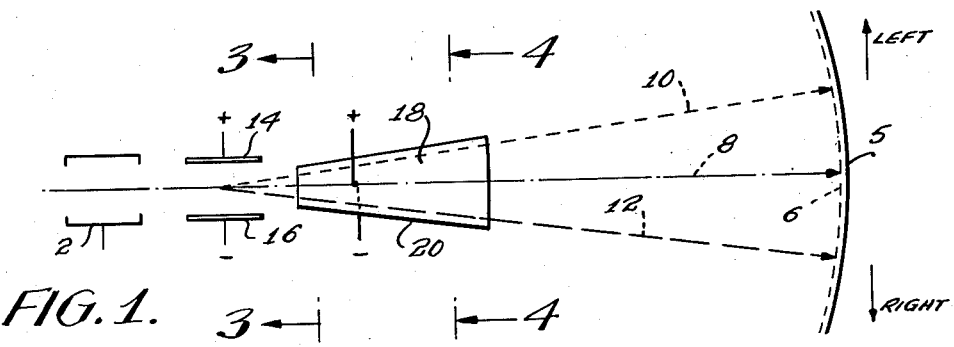
FIG.1.
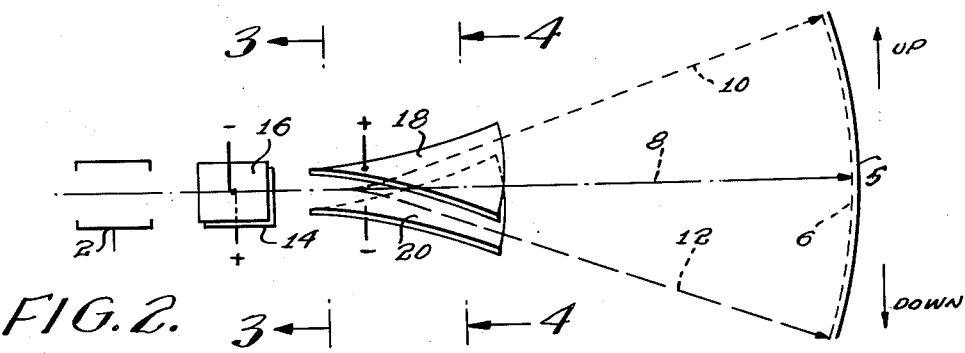
FIG.2.
FIG.3. FIG.4.
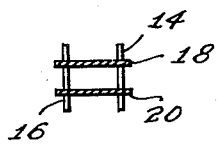 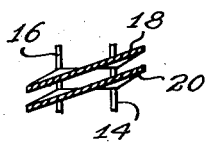
FIG.5.
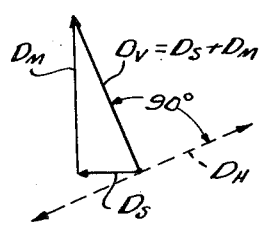
FIG.6.
INVENTOR.
Harry E. Kallmann
BY Nov. 13, 1951        H. E. KALLMANN        2,574,975
ELECTRON BEAM DEFLECTING SYSTEM
Filed Jan. 17, 1950        3 Sheets-Sheet 2
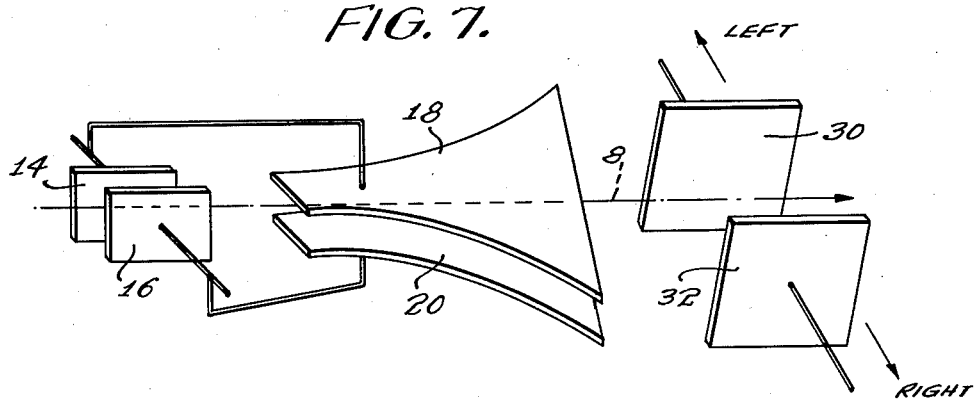
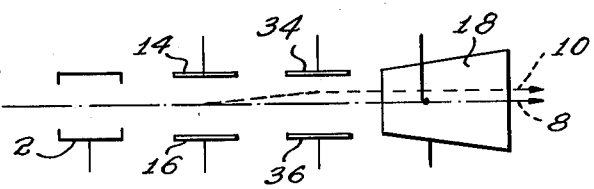
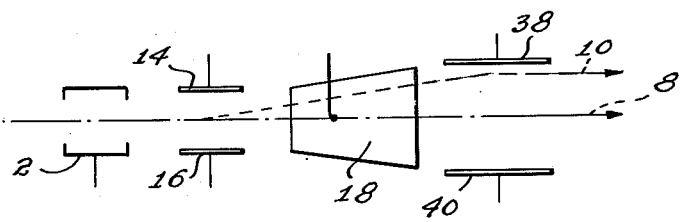
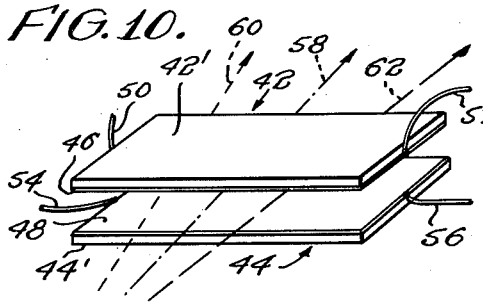
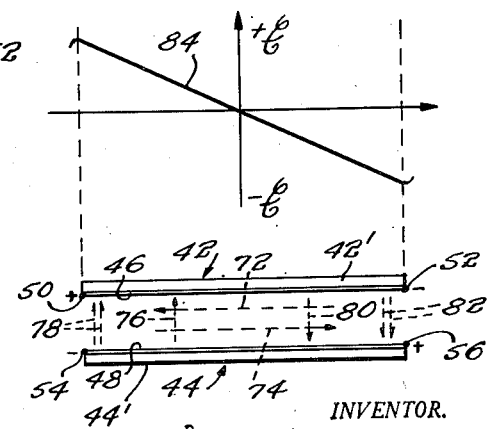
INVENTOR.
Harry E. Kallmann
BY Nov. 13, 1951     H. E. KALLMANN     2,574,975
ELECTRON BEAM DEFLECTING SYSTEM
Filed Jan. 17, 1950     3 Sheets-Sheet 3

INVENTOR
Henry E. Kallmann
BY

Patented Nov. 13, 1951

2,574,975

UNITED STATES PATENT OFFICE 2,574,975

ELECTRON BEAM DEFLECTING SYSTEM

Heinz E. Kallmann, New York, N. Y.

Application January 17, 1950, Serial No. 139,013

8 Claims. (Cl. 313—78)

My present invention relates mainly to electron beam systems, and more particularly to deflection systems for cathode ray tubes.

My present invention serves to increase the efficiency of electron beam deflecting systems, in particular of electrostatic deflecting systems in cathode ray tubes as used in oscilloscopes, and for radar and television presentation.

In such systems, with a given beam accelerating voltage determined by the required image brightness, the deflection angle per volt deflecting potential is proportional to the length of the deflecting plates and inversely proportional to their spacing.

For highest deflecting efficiency, the deflecting plates are thus made as long, and spaced as closely, as possible. Limits to close spacing are imposed by the need to clear the finite thickness of the beam, and by the need to clear the beam up to its maximum desired deflection. The latter is the more serious limitation and deflecting plates are thus, at present, spaced many beam thicknesses.

The plates may be spaced closely near the edges of the plates where the beam enters and their spacing progressively increased to a maximum near the edges where the beam leaves them, in proportion to the increasing maximum beam deflection; but the so obtained improvement in deflecting efficiency is slight.

The improvements in deflecting systems here proposed offer means of keeping the spacing of the deflecting plates, throughout their length, just wide enough to clear the thickness of the electron beam, thus increasing the deflection sensitivity of the system in proportion of the reduced spacing.

To this end, the beam is subjected, in accordance with my present invention, first to the intended signal deflection, and then led through auxiliary power deflecting plates along different paths spaced laterally in proportion to the previous signal deflection.

In one form of my invention, the signal voltages are also applied to the auxiliary power deflection plates.

In another application of my invention, the varying signal deflecting potentials are applied only to the signal deflecting plates while the power deflection is produced by a constant inhomogenous field between power deflecting plates of a new kind.

In either case, the power deflecting plates may then be so shaped as to approach everywhere closely all different possible paths of the electron beam.

The novel features which I consider as characteristic for my invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 1 is a top view of a combined signal and power deflection system according to my present invention;

Fig. 2 is a side view of the combined signal and power deflection system shown in Fig. 1;

Fig. 3 is a cross section through the system shown in Figs. 1 and 2, along line 3—3 of these figures;

Fig. 4 is another cross section through the system shown in Figs. 1 and 2, along line 4—4 of these figures;

Fig. 5 is a vector diagram explaining the magnifying effect of short and straight power deflecting plates;

Fig. 6 is a vector diagram explaining the magnifying effect of long and twisted power deflecting plates;

Fig. 7 is a perspective view of a system similar to the one shown in Figs. 1 and 2, and equipped with scanning deflecting plates;

Fig. 8 is a top view of a system similar to the one shown in Figs. 1 and 2, but equipped with an additional pair of signal deflecting plates arranged in a particular manner;

Fig. 9 is a top view of another system similar to the system shown in Figs. 1 and 2, but equipped with an additional pair of signal deflecting plates in a different location;

Fig. 10 is a perspective view of a pair of power deflecting plates for creating a constant inhomogenous power deflecting field;

Fig. 11 shows one of a pair of power deflecting plates serving the same purpose, but being of different construction;

Fig. 12 is an axial view of the power deflecting plates shown in Fig. 10, combined with a graph showing the distribution of the electrostatic field between the plates;

Figure 13:
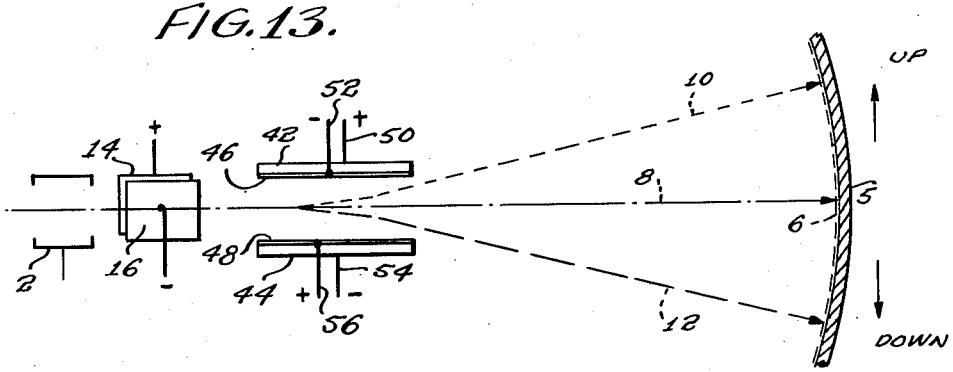
Fig. 13 shows a combined signal and power deflecting system embodying power deflecting plates of the types shown in Figs. 10 and 12.

A combined signal and power deflection system of the first kind is shown in Figures 1 and 2 in top view and side view, respectively. In both figures, the electron beam is shown emerging from the accelerating anode 2 and then entering between the signal deflecting plates 14 and 16. The signal deflecting voltage from a source not shown is applied to these plates, for example as shown with positive sign to plate 14 and with negative sign to plate 16. For zero signal, the beam remains axial, traveling along the tube axis 8, and reaching the screen 6 deposited on the tube envelope 5 as indicated.

For a signal voltage of the polarity shown, the beam is deflected towards the positive signal deflecting plate 14, as shown in Fig. 1, and then follows the path shown as dotted line 10 to the left side of the screen 6.

For signal voltages of the opposite polarity, the beam would be deflected towards the signal deflecting plate 16 and reach the right side of the screen 6 along the path shown in Fig. 1 as broken line 12.

After leaving the signal deflecting plate system comprising the plates 14 and 16, the beam enters the power deflecting plate system, shown in top view in Fig. 1 and composed of plates 18 and 20, with plate 18 arranged above plate 20.

As evident from Fig. 1, the beam will take a different path through the power deflecting system, according to the previous deflection by the signal deflecting plates 14 and 16. This path will be axial—along the dash-dotted line 8—for zero signal, and along the lines 10 and 12 for maximum positive and negative signal voltage, respectively, and along paths, not shown, between these extremes displaced from the axial, i. e. original path 8, in proportion to the signal voltage applied to plates 14 and 16.

Any deflection by the power deflecting plates 18 and 20 would be substantially at a right angle with that due to the signal deflecting plates 14 and 16 and thus not show in the top view of Fig. 1. Similarly, the lateral deflection due to the signal deflecting plates 14 and 16 does not show in the side view of Fig. 2.

Fig. 2 shows the particular twisted shape of the power deflecting plates 18 and 20 proposed by me. Such twisted power deflecting plates have the following advantage:

Let it be assumed that there is a permanent electrical connection between plates 18 and 14 and between plates 20 and 16, neither shown. With zero signal voltage applied to both pairs of plates, the beam remains axial and follows its straight original path 8 shown in Fig. 2 through the middle of the power deflecting plate system 18 and 20 to the screen 6.

With a positive signal voltage applied to both the plates 14 and 18, the beam is first signal-deflected to the left as shown in Fig. 1, and then power-deflected at right angle to the signal deflection in upward direction, as shown in Fig. 2.

Similarly, with a signal voltage of the opposite polarity applied to both deflecting plate systems, the beam is first signal-deflected to the right as shown in Fig. 1, and then power-deflected at right angle to the signal deflection downward towards plate 20 as shown by the broken line 12 in Fig. 2.

In order not to obstruct the deflected beam, the pair of power-deflecting plates 18 and 20 must either be widely spaced or else twisted, in accordance with my present invention, as shown. It should be recognized that due to the auxiliary deflection the beam is laterally displaced within the power-deflecting plate system 18, 20 in proportion to the signal voltage; and further, that with both deflecting plate systems connected together and to the same signal voltage source the deflection by the power deflecting plates 18, 20 must always be proportional to the deflection by the signal deflecting plates 14, 16. Thus, all possible paths of the beam must form a single twisted sheet nowhere thicker than the beam. This sheet is straight along the axis of the systems, i. e. along the original path 8 of the beam, and bends towards plate 18 for increasingly positive signal voltages, and towards plate 20 for increasingly negative signal voltages.

Where the beam bends towards plate 18, this plate 18 is bent away from the beam and simultaneously the other plate 20 is bent towards the beam by the same amount; and where the beam bends towards plate 20, this plate 20 is bent away from the beam and simultaneously the plate 18 is bent towards the beam by the same amount. Thus, both main deflecting plates 18 and 20 remain everywhere parallel to the sheet formed by all possible paths of the beam and to each other and need nowhere be spaced further from each other than the thickness of the beam. The curvature along the beams paths is increasingly steep, with opposite twist on both sides of the axis 8. But since the predeflection and the main deflection are always proportional to each other, all sections across the main deflecting plate system will be straight. A section 3—3 near the entrance edge will show both power deflecting plates 18 and 20 at right angles to the signal deflecting plates 14 and 16, as shown in Fig. 3; and a section 4—4 near the exit edges will show them both turned by the same angle, as shown in Fig. 4.

The following theoretical considerations will fully explain the magnifying effect of my new deflecting system:

The total deflection $D_V$ of the electron beam is the vector sum of the two separate deflections, $D_S$ by the signal deflecting system and $D_M$ by the magnifying power deflecting system. For negligible twist of the latter, these two deflections may be taken as at right angle to each other as shown in the vector diagram of Fig. 5. There the vector $D_S$ 22 is added to the vector $D_M$ 24 at right angle to the sum $D_S + D_M = D_V$.

If, in addition to the signal-proportional deflection $D_V$, a time-proportional sawtooth scanning deflection $D_H$ is desired, a third pair of deflecting plates may be incorporated in the tube, between the power deflecting plates 18 and 20, and the screen 6, and positioned at such an angle as to cause deflection of the beam at right angles to $D_V$, in the direction shown as broken line $D_H$ in Fig. 5.

For appreciable twist of the power deflecting plates 18 and 20, the direction in which they deflect the signal-deflected beam also changes appreciably as it passes through them, as will be evident from Fig. 4. Thus, the final direction of the lines 10 and 12 as shown in Fig. 1 would have to be turned back (not shown) near the exit of plates 18 and 20 towards the center line 8; and in severe cases their projection as shown in Fig. 1 could even cross line 8, indicating that due to the twist of the power deflecting system the original lateral deflection due to the signal deflecting plates 14 and 16 has been reversed.

The total deflection $D_V$ is then more accurately than in Fig. 5 represented by the vector diagram shown in Fig. 6: There the vector $D_M$ is shown to start out at right angle to the vector $D_S$ but then to turn to follow the twisting field of the power deflecting system. With the changing direction of the total deflection $D_V$ the direction of the scanning deflection at right angles to it must also be changed as shown by the broken line $D_H$. By proper proportioning of the whole deflection system formed by plates 14, 16, 18, and 20 and the distance of screen 6, it is possible to make the lateral deflection due to the twist of the power deflecting plates 18 and 20 just equal and opposite to that in the signal deflection system; the scanning deflection plates will then be parallel to the plates 14 and 16.

A whole deflecting system according to my present invention comprising three pairs of plates as described above is shown in Fig. 7, with the scanning deflecting plates numbered 30 and 32.

It may be desired, e. g. in order to reduce the spacing of the scanning deflecting plates, to reduce the lateral deflection angle of the beam due to the signal deflection in plates 14 and 16 after the beam has been sufficiently displaced laterally for convenient shaping of the power deflecting plates 18 and 20. To this end yet another pair of auxiliary deflecting plates may be introduced, parallel to the signal deflecting plates 14 and 16 and fed by the same signals and dimensioned to produce equal and opposite deflection to that by plates 14 and 16. These auxiliary plates 34 and 36 may be located between the signal and the power deflecting system, as shown in Fig. 8. Or they may follow the power deflecting plates as shown in Fig. 9, in which figure these plates are indicated by reference numerals 38 and 40.

The method, as outlined, of first deflecting the beam laterally in a signal deflecting system before deflection by the power deflecting system is also used in the second embodiment of my invention. However, while in the first system the signal voltage is also applied to the power deflecting plates, improving total deflection by their close spacing over considerable length, in the second system the signal voltage is applied only to the signal deflecting plates. And while in the first system the voltage applied to the power deflecting plates varied with the signal voltage but produced a substantially homogenous deflecting field, in the second system the magnifying power deflecting voltage is constant, e. g. supplied from a D. C. source, but the field strength acting upon the beam varies with the path taken by the beam according to the signal deflection in the preceding signal deflecting plates.

As in the first system, in the second embodiment of my new electron beam system the signal deflecting plates fed by the signal source serve to displace the beam laterally between the power deflecting plates; but these power deflecting plates are of a novel kind, producing a constant inhomogenous deflecting field of a particular shape.

Such a pair of power deflecting plates is shown in Fig. 10: Each of these plates 42 and 44 may comprise a flat insulating body 42' and 44', each coated on the surface facing the beam and the other plate with a high-resistance conductive coating 46 and 48, respectively. Direct current may be fed to these conductive coatings 46 and 48 via terminals located at the lateral edges of plates 42 and 44, numbered 50 and 52 for the former, and 54 and 56 for the latter plate.

The undeflected beam may pass through the center of the system along line 58; if deflected laterally in the one or other direction by the signal voltage in a signal-deflecting plate system before entering between the power deflecting plates 42 and 44, the beam will pass between these plates 42 and 44 along lines 60 and 62, respectively.

In an alternative construction of the power deflecting plates, each plate may consist of an insulating plate 64 wound with a close winding of resistance wire 66 connected to terminals at the lateral edges, 68 and 70, as shown in Fig. 11 for one such plate.

In either case, if constant current from a suitable source (not shown) is fed through the resistors of both plates in opposite directions, an electrostatic field corresponding to the voltage drop along the resistances is set up in the space between the plates.

Such a field is shown in axial view for a pair of plates according to Fig. 10 in the lower part of Fig. 12: There, with the positive terminal of the voltage source connected to terminal 50 at the left edge of the upper plate 42 as well as to the terminal 56 at the right hand edge of the lower plate 44, and with its negaitve terminal connected with the terminals 52 and 54 at the opposite edges of the two deflecting plates, the resulting electrostatic field between the two plates may be understood with the help of the broken-line arrows. The lateral field due to the voltage drop along resistor 46 on upper plate 42 is represented by arrow 72 pointing from minus to plus. The equal and opposite field due to voltage drop along resistor 48 on lower plate 44 is indicated by arrow 74. It is evident that these lateral field components will cancel each other completely at the center between the two plates and, for close-spaced plates, very nearly so in the whole space between the plates. Thus, there will be no appreciable lateral field within this kind of deflecting system.

However, there will be a vertical electrostatic field component which is due to potential differences between points of the two plates facing each other: There is no potential difference between their centers and thus the vertical field component vanishes near the center. Towards the left, points of the upper plate 42 are increasingly more positive than opposite points of the lower plate 44 and the vertical field component increases in proportion, shown by arrow 76 pointing up, and by double arrow 78 indicating greater field strength, in the same direction. Similarly, towards the right, the field strength increases from the center but in the opposite direction as shown by arrow 80 and double arrow 82 pointing down. If the resistance material 46 and 48 is evenly distributed from edge to edge across the two plates 42 and 44, the change of field strength from edge to edge will be linear. A plot of field strength across the system as shown in the upper part of Fig. 12 will then result in a straight line 84 from edge to edge.

An electron beam passing between the plates 42 and 44 at their center is subject to no field and will not be deflected. However, a beam passing between the plates in a region to the left or right of the center will be subject to vertical deflecting fields, the stronger the further from the center, and upwards to the left, downwards to the right.

The resultant deflection is proportional to the length of the plates 42 and 44 in the direction of the beam and inversely proportional to their spacing as in any electrostatic deflecting system, and also proportional to the voltage applied to the two resistors 46 and 48 and may thus be controlled by adjusting the D. C. voltage applied to the system. By making the resistivity of the resistors 46 and 48 very high, the D. C. current through them may be kept very small.

Figure 13 is a side view analogous to Fig. 2 and shows such a pair of deflecting plates 42 and 44 combined with the signal deflecting plates 14 and 16 between anode 2 and screen 6 of a cathode ray tube. Again as in Fig. 2, the signal deflection by plates 14 and 16 is lateral to the magnifying power deflection: With zero signal voltage on plates 14 and 16, the beam passes through the center of the space between plates 42 and 44, remains undeflected and reaches the screen 6 along the axis 8. If a positive signal voltage is applied to plates 14 and 16, making the former positive to the latter, the beam is deflected by these plates to the left as shown in Fig. 1 and enters the power deflecting system to the left in Fig. 12, and is thus deflected upwards to reach the screen 6 along the path shown in Fig. 13 as dotted line 10. Similarly, a negative signal voltage applied to plates 14 and 16 will cause the beam to be deflected by these plates to the right, as shown in Fig. 1 and to enter the space between the plates 42 and 44 to the right in Fig. 12 where it will be deflected downwards to reach the screen 6 via the path shown in Fig. 13 as broken line 12.

Since the deflection by plates 14 and 16 is proportional to the signal voltage, the lateral displacement of the beam in the power deflecting system, the strength of the vertical field there encountered and the resulting vertical deflection will all be proportional to the signal voltage. It may thus be said that the power deflection system, without being itself connected to the signal source, simply acts as a proportional deflection magnifier.

In cases where this is desired, any kind of non-linear relation between spot displacement on the screen and signal voltage may be had by correspondingly modifying the distribution of resistance along plates 42 and 44 or their width or spacing, or by modulating the voltage fed to them.

Since the electron beam has a finite cross section, it follows that its different parts are differently deflected by the inhomogenous field between plates 42 and 44. Thus, even when properly focused, the spot on the screen will be elongated in the direction of signal deflection. This effect may be minimized by holding the change of field strength across the power deflecting system to low values compared with the thickness of the beam and to achieve large deflecting efficiency, instead, by making the plates 42 and 44 very long in the direction of the beam and to keep them spaced very closely. Therefore it will be advantageous to twist their shape as discussed in connection with the embodiment shown in Figs. 2 to 7.

The residual spot elongation due to the deflection by an inhomogenous field will be found to be similar to astigmatism and may thus be compensated by equal and opposite astigmatic distortion by electrodes not shown introduced between the power deflecting system and the screen, and connected to suitable D. C. potentials.

Figure 14:
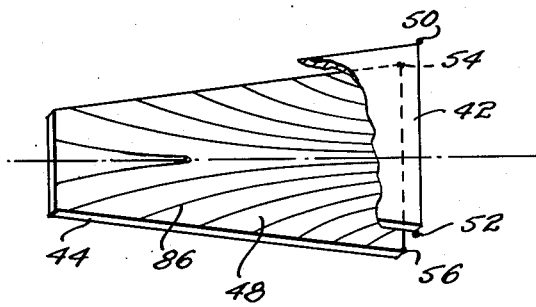
Fig. 14 is a perspective view of a modification of the power deflecting plates similar to the plates shown in Figs. 10 and 12, one of the plates being partly broken away.

It may further be found advantageous to increase the inhomogenous deflecting field between plates 42 and 44 gradually from the entrance edge to the exit edge. Thus, the electrodes 50, 52, 54, and 56 may be placed near the corners of the exit edges, as shown in Fig. 14, resulting in a longitudinally increasing field strength corresponding to the equipotential lines 86.

Figure 15:
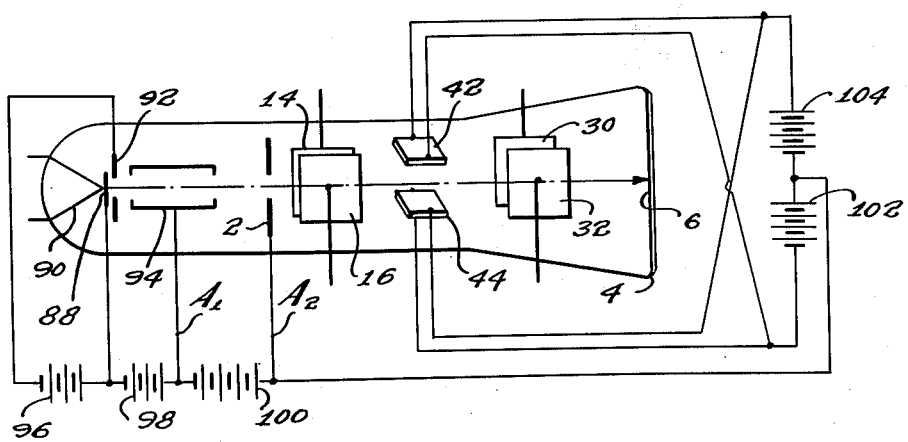
Fig. 15 is a schematic diagram of a cathode ray tube circuit embodying a combined signal and power deflection system according to Fig. 13.

In Fig. 15 is shown a circuit for operating a cathode ray tube incorporating a deflection magnifier according to Figs. 10, 12, and 13. The grid 92 is biased negatively relative to the cathode 90, by battery 96; the first anode, 94, and the second anode, 2, are held at positive potentials relative to the cathode 90 by batteries 98 and 100.

The signal voltage is applied to the signal deflecting plates 14 and 16, from a signal source, not shown, held at the approximate potential of the second anode 2. The currents across the two power deflecting plates 42 and 44 are both supplied by batteries 102 and 104 whose junction is held at the potential of the second anode 2. A pair of scanning deflecting plates 30 and 32, is shown between the power deflecting plates and screen 6, to be fed with time-proportional saw-tooth scanning deflecting potentials in familiar manner.

While I have discussed only electrostatic deflection and applications such as oscilloscopes, it will be evident that in either system the first deflection may be done magnetically and also that a suitable combination of permanent or electro-magnets may be used to produce an inhomogeneous magnetic field that will act as deflection magnifier in a manner corresponding to the electrostatic device described, and with the same result.

It will be understood that each of the elements described above, or two or more together, may also find a useful application in other types of electron beam deflection systems, differing from the types described above, or be adapted for deflection of other electrically charged particles.

While I have illustrated and described the invention as embodied in cathode ray tubes, I do not intend to be limited to the details shown, since various modifications and structural changes may be made without departing in any way from the spirit of my invention.

Without further analysis, the foregoing will so fully reveal the gist of my invention that others can by applying current knowledge readily adapt it for various applications without omitting features that, from the standpoint of prior art, fairly constitute essential characteristics of the generic or specific aspects of this invention, and, therefore, such adaptations should and are intended to be comprehended within the meaning and range of equivalence of the following claims.

What I claim as new and desire to secure by Letters Patent is:

1. In an electron beam deflecting system embodying means for emitting an electron beam adapted to be influenced by electric signals, in combination, signal deflecting means arranged and constructed so as to deflect said electron beam proportionately to variations of said electric signals from its original path in a signal deflection plane; and a pair of substantially parallel twisted power deflecting plates arranged along the path of the thus deflected electron beam, twisted about an axis coinciding substantially with said path and forming an oblong entrance opening for said deflected electron beam arranged at least substantially in said signal deflection plane, said pair of substantially parallel twisted power deflecting plates constructed so as to deflect said deflected electron beam in a direction lateral to said oblong entrance opening and proportionately to the distance at which said deflected electron beam enters said oblong entrance opening from that point of said oblong entrance opening at which the electron beam enters said entrance opening when passing along its original path.

2. In an electron beam deflecting system embodying means for emitting an electron beam adapted to be influenced by electric signals, in combination, signal deflecting means arranged and constructed so as to deflect said electron beam proportionately to variations of said electric signals from its original path in a signal deflection plane; a pair of substantially parallel twisted power deflecting plates arranged along the path of the thus deflected electron beam, twisted about an axis coinciding substantially with said path and forming an oblong entrance opening for said deflected electron beam arranged at least substantially in said signal deflection plane; and means for creating between said pair of substantially parallel twisted power deflecting plates a time-variable homogenous electron deflecting field varying simultaneously with and proportionately to said variations of said electric signals so as to deflect said deflected electron beam in a direction substantially normal to said oblong entrance opening and proportionately to the distance at which said deflected electron beam enters said oblong entrance opening from that point of said oblong entrance opening at which the electron beam enters said entrance opening when passing along its original path.

3. In an electron beam deflecting system embodying means for emitting an electron beam adapted to be influenced by electric signals, in combination, signal deflecting means arranged and constructed so as to deflect said electron beam proportionately to variations of said electric signals from its original path in a signal deflection plane; a pair of substantially parallel twisted power deflecting plates arranged along the path of the thus deflected electron beam, twisted about an axis coinciding substantially with said path and forming an oblong entrance opening for said deflected electron beam arranged at least substantially in said signal deflection plane; and means for creating between said pair of substantially parallel twisted power deflecting plates a time-constant inhomogenous electron-deflecting field the intensity of which increases from one end of said oblong entrance opening to the other so as to deflect said deflected electron beam in a direction substantially normal to said oblong entrance opening and proportionately to the distance at which said deflected electron beam enters said entrance opening from that point of said oblong entrance opening at which the electron beam enters said entrance opening when passing along its original path.

4. In an electron beam deflecting system embodying means for emitting an electron beam adapted to be influenced by electric signals, in combination, signal deflecting means arranged and constructed so as to deflect said electron beam proportionately to variations of said electric signals from its original path in a signal deflection plane; a pair of substantially parallel twisted power deflecting plates arranged along the path of the thus deflected electron beam, twisted about an axis coinciding substantially with said path and forming an oblong entrance opening for said deflected electron beam arranged at least substantially in said signal deflection plane; and means for creating between said pair of substantially parallel twisted power deflecting plates a time-constant inhomogenous electron-deflecting electrostatic field the intensity of which increases from one end of said entrance opening to the other so as to deflect said deflected electron beam in a direction substantially normal to said oblong entrance opening and proportion-
ately to the distance at which said deflected electron beam enters said oblong entrance opening from that point of said oblong entrance opening at which the electron beam enters said entrance opening when passing along its original path.

5. In an electron beam deflecting system embodying means for emitting an electron beam adapted to be influenced by electric signals, in combination, signal deflecting means arranged and constructed so as to deflect said electron beam proportionately to variations of said electric signals from its original path in a signal deflection plane; a pair of substantially parallel twisted power deflecting plates arranged along the path of the thus deflected electron beam, twisted about an axis coinciding substantially with said original path and having two substantially parallel entrance edges arranged substantially parallel to and on opposite sides of said signal deflection plane so as to form an oblong entrance opening for said deflected electron beam and having two substantially parallel exit edges forming an oblong exit opening for the twice-deflected electron beam arranged at an acute angle with said oblong entrance opening, said pair of substantially parallel twisted power deflecting plates constructed so as to deflect said deflected electron beam in a direction lateral to said oblong entrance opening and proportionately to the distance at which said deflected electron beam enters said oblong entrance opening from that point of said oblong entrance opening at which the electron beam enters said entrance opening when passing along its original path; and a pair of substantially parallel scanning deflecting plates arranged along the path of the thus twice-deflected electron beam substantially normal to said oblong exit opening formed by said substantially parallel twisted power deflecting plates.

6. In an electron beam deflecting system embodying means for emitting an electron beam adapted to be influenced by electric signals, in combination, signal deflecting means arranged and constructed so as to deflect said electron beam proportionately to variations of said electric signals from its original path in a signal deflecting plane; a pair of substantially parallel twisted power deflecting plates arranged along the path of the thus deflected electron beam, twisted about an axis coinciding substantially with said original path and having two substantially parallel entrance edges arranged substantially parallel to and on opposite sides of said signal deflecting plane so as to form an oblong entrance opening for said deflected electron beam and having two substantially parallel exit edges forming an oblong exit opening for the twice-deflected electron beam arranged at an acute angle with said oblong entrance opening; means for creating between said pair of substantially parallel twisted power deflecting plates a time-variable homogenous electron deflecting field varying simultaneously with and proportionately to said variations of said electric signals so as to deflect said deflected electron beam in a direction substantially normal to said oblong entrance opening and proportionately to the distance at which said deflected electron beam enters said oblong entrance opening from that point of said oblong entrance opening at which the electron beam enters said entrance opening when passing along its original path; and a pair of substantially parallel scanning deflecting plates arranged along the path of the thus twice-deflected electron beam substantially normal to said oblong exit opening formed by said substantially parallel twisted power deflecting plates.

7. In an electron beam deflecting system embodying means for emitting an electron beam adapted to be influenced by electric signals, in combination, signal deflecting means arranged and constructed so as to deflect said electron beam proportionately to variations of said electric signals from its original path in a signal deflecting plane; a pair of substantially parallel twisted power deflecting plates arranged along the path of the thus deflected electron beam, twisted about an axis coinciding substantially with said path and forming an oblong entrance opening for said deflected electron beam arranged at least substantially in said signal deflection plane and an oblong exit opening for the twice-deflected electron beam forming an acute angle with said oblong entrance opening; means for creating between said pair of substantially parallel twisted power deflecting plates a time-constant inhomogenous electron deflecting field the intensity of which increases from one end of said oblong entrance opening to the other so as to deflect said deflected electron beam in a direction substantially normal to said oblong entrance opening and proportionately to the distance at which said deflected electron beam enters said oblong entrance opening from that point of said oblong entrance opening at which the electron beam enters said entrance opening when passing along its original path; and a pair of substantialy parallel scanning deflecting plates arranged along the path of the thus twice-deflected electron beam substantially normal to said oblong exit opening formed by said substantially parallel twisted power deflecting plates.

8. In an electron beam deflecting system embodying means for emitting an electron beam adapted to be influenced by electric signals, in combination, signal deflecting means arranged and constructed so as to deflect said electron beam proportionately to variations of said electric signals from its original path in a signal deflection plane; a pair of substantially parallel twisted power deflecting plates arranged along the path of the thus deflected electron beam, twisted about an axis coinciding substantially with said path and forming an oblong entrance opening for said deflected electron beam arranged at least substantially in said signal deflection plane and an oblong exit opening for the twice-deflected electron beam forming an acute angle with said oblong entrance opening; means for creating between said pair of substantially parallel twisted power deflecting plates a time-constant inhomogenous electron deflecting electrostatic field the intensity of which increases from one end of said entrance opening to the other so as to deflect said deflected electron beam in a direction substantially normal to said oblong entrance opening and proportionately to the distance at which said deflected electron beam enters said oblong entrance opening at which the electron beam enters said entrance opening when passing along its original path; and a pair of substantially parallel scanning deflecting plates arranged along the path of the thus twice-deflected electron beam substantially normal to said oblong exit opening formed by said substantially parallel twisted power deflecting plates.

HEINZ E. KALLMANN.

REFERENCES CITED

The following references are of record in the file of this patent:

UNITED STATES PATENTS

| Number | Name | Date |
|---|---|---|
| 2,050,628 | Prinz | Aug. 11, 1936 |
| 2,108,091 | Von Ardenne | Feb. 15, 1938 |
| 2,182,382 | Hollmann | Dec. 5, 1939 |
| 2,213,172 | Sherman | Aug. 27, 1940 |
| 2,240,304 | Koch | Apr. 29, 1941 |
| 2,293,539 | Gray | Aug. 18, 1942 |
| 2,436,393 | Maggio | Feb. 24, 1948 |
| 2,439,504 | Broadway | Apr. 13, 1948 |